…

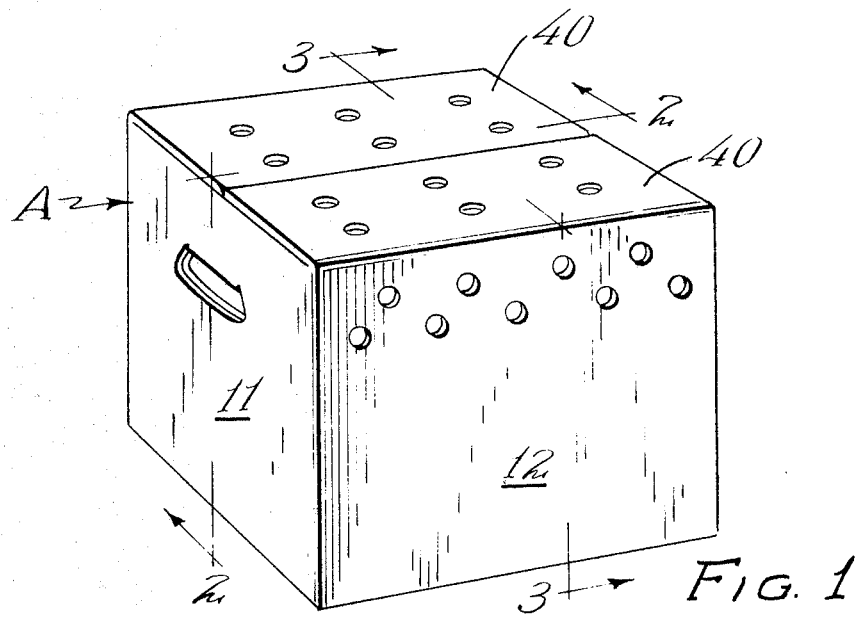
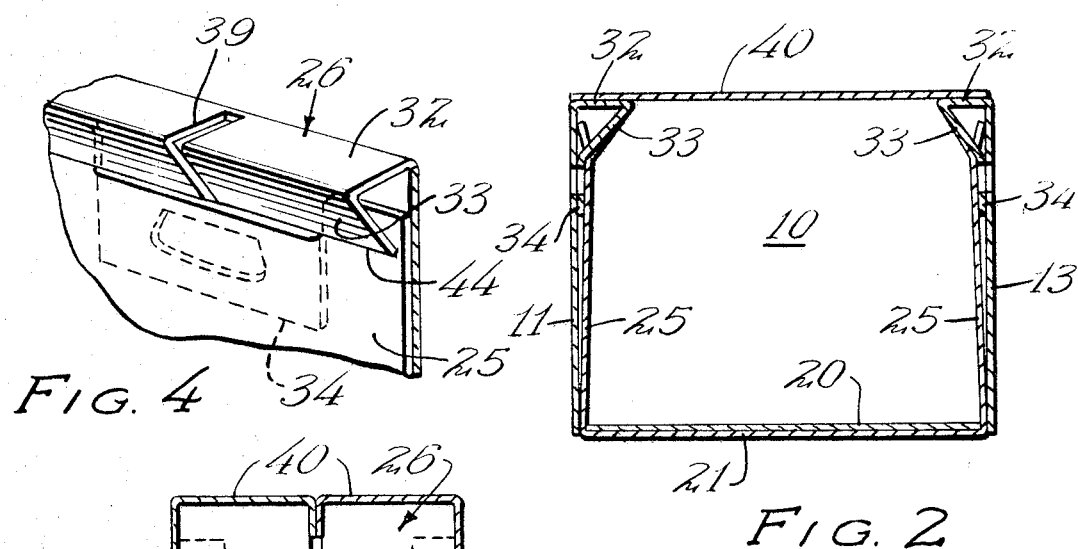
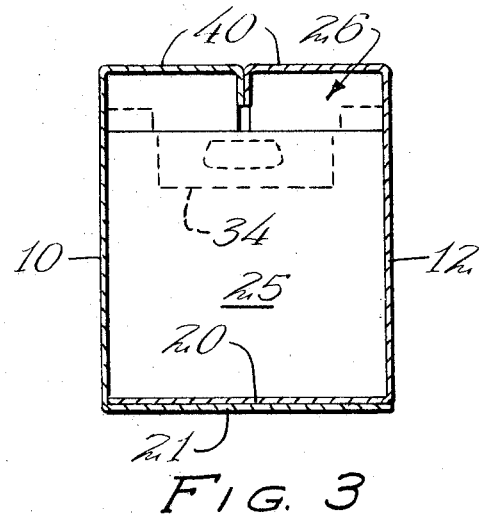
INVENTOR
FRANK W. LOCKE
JAMES A. HARVIEUX
BY Robert M. Dunning
ATTORNEY INVENTOR
FRANK W. LOCKE
JAMES A. HARVIEUX
BY Robert M. Dunning
ATTORNEY

United States Patent Office 3,522,904
Patented Aug. 4, 1970

3,522,904
ANIMAL SHIPPING CONTAINER
Frank W. Locke, Minnneapolis, and James A. Harvieux, Stillwater, Minn., assignors to Hoerner Waldorf Corporation, St. Paul, Minn., a corporation of Delaware
Filed July 29, 1968, Ser. No. 748,407
Int. Cl. B65d 5/00
U.S. Cl. 229—16                    5 Claims

ABSTRACT OF THE DISCLOSURE

An animal shipping container includes rectangularly aranged side and end walls. Bottom panels are hinged to the lower edges of the side walls and folded into face contact. End wall liner panels are hinged to the end edges of the lowermost bottom panel and lie inwardly of said end walls. A flap structure is hinged to the upper edge of each end wall and includes an inwardly extending horizontal flange and a downwardly and outwardly inclined reinforcing flange terminating against the inner surface of an end wall liner panel. A central tuck flange extends through a notch in the upper edge of the end wall liner panel and lies between said liner panel and the adjacent end wall to lock the flap structure in place. Cover panels are hinged to the upper edges of the side walls and tuck flaps on the cover panels engage in slots in the flap structures. Hand holes are provided in the end walls outwardly of the liner panels.

---

This invention relates to an improvement in animal shipping containers and deals particularly with a container which may be used to contain a dog or other small animal during transportation.

Kennels and similar establishments which have as their business the raising of small animals often have a problem in shipping the animals to the ultimate owner of the animal or to pet stores selling the animals. The use of metal cages for the purpose is quite customary for this purpose. However, cages are relatively expensive, and are impractical to use unless returned for reuse. It is an object of the present invention to provide a shipping container for dogs and other small animals which may be easily handled and which may be easily opened and reclosed so that the animal may be fed during shipment if necessary.

A feature of the present invention resides in the provision of a container having hand holes at opposite ends by means of which a container may be carried. These hand holes are protected by an inner wall which is so arranged so that the fingers extending through the hand holes will not extend into the pet area. As a result, the pet cannot bite the fingers of a person carrying the container.

A feature of the present invention resides in the provision of a container of the type in question including a series of potential vent holes which may be punched out as required to provide the necessary ventilation. The number of vent holes which are punched out may vary with variations in the temperature.

A further feature of the invention resides in the provision of a container which may be supplied in flat form, and which may be readily set up when desired without the use of staples, tape, or other fastening means.

A further feature of the present invention resides in the provision of a triangular strut extending along the upper edges of the end walls of the container, the triangular strut being centrally slit to accommodate tuck flaps on the two cover panels. The triangular strut provides a good stacking strength and assists in holding the container in its rectangular form.

These and other objects and novel features of the present invention will be more clearly and fully set forth in the following specification and claims.

In the drawings forming a part of the specification.

FIG. 1 is a perspective view of the animal shipping box, showing the general arrangement thereof.

FIG. 2 is a sectional view through the container, the position of the section being indicated by the line 2—2 of FIG. 1.

FIG. 3 is a sectional view through the container, the position of the section being indicated by 3—3 of FIG. 1.

FIG. 4 is a perspective sectional detail showing one of the reinforcing struts.

Figure 5:
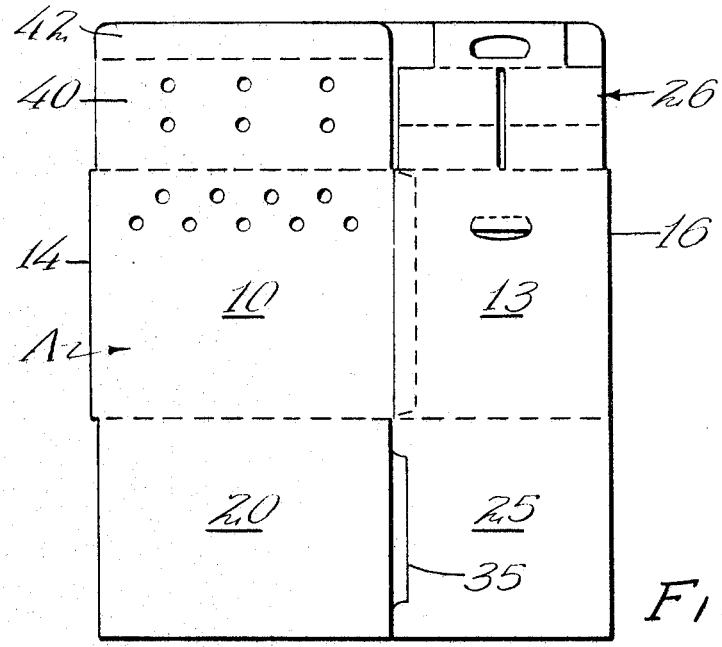
FIG. 5 is a diagrammatic view of the blank in the form in which it is supplied to the user.
Figure 6:
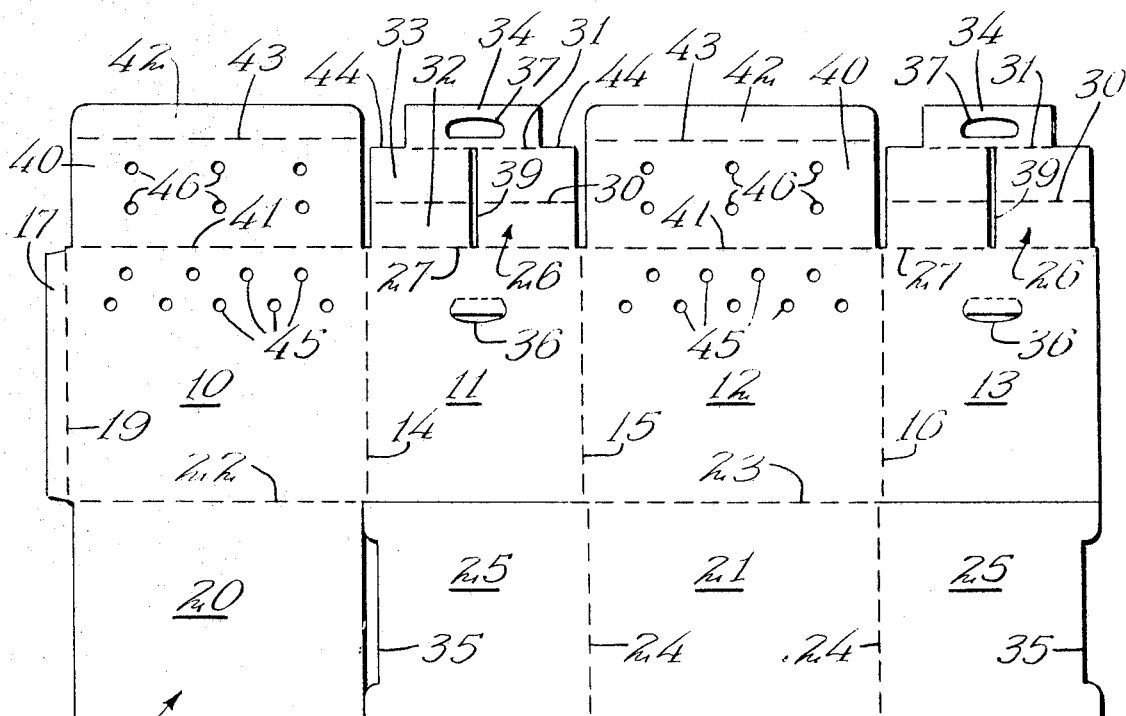
FIG. 6 is a diagrammatic view of the blank from which the shipping container is formed.

As indicated in FIG. 6 of the drawings, the pet shipping container is indicated in general by the letter A, and is cut and creased to provide a side wall 10, an end wall 11, a second side wall 12 and a second end wall 13. These walls 10, 11, 12 and 13 are foldably connected along parallel fold lines 14, 15 and 16. A glue flap or stitch flap 17 is connected to an end wall of the series such as to the edge of the wall panel 10 along a fold line 19 which is parallel to the previously described lines of fold.

Bottom closure panels 20 and 21 are foldably connected to the lower edges of the side walls 10 and 12 along aligned fold lines 22 and 23. The bottom closure panel 20 is of a size and shape substantially corresponding to the cross-sectional area of the container taken on a horizontal plane. The bottom closure panel 21 is of substantially the same size and shape as the panel 20. The ends of the closure panel 21 are hingedly connected along parallel fold lines 24 to end wall liner panels 25 which are preferably of a length which is somewhat less than the height of the end walls 11 and 13.

In forming the bottom closure, the closure panel 20 is folded into face contact with the inner surface of the side wall 10. The end wall liner panels 25 are folded along the fold line 24 to overlie the bottom panel 21. This combined structure is then folded through 90° or into a position to close the bottom of the tubular wall structure. The end wall liner panels 25 are then folded upwardly and outwardly against the end walls 11 and 13, and the closure panel 20 is then folded down into face contact with the closure panel 21. The container thus formed is provided with a double thickness bottom closure and end walls which are of double thickness throughout the major portion of their height.

Flap structures 26 are foldably connected to upper edges of the end walls 11 and 13 along aligned fold lines 27. Each flap structure is divided into three sections by fold lines 30 and 31 which are parallel to the fold lines 27. The area between the fold lines 27 and 30 is designed to form a horizontal flange 32. The area between the fold lines 30 and 31 forms a diagonal supporting flange 33. The section outwardly of the fold line 31 comprises a tuck flange 34. The tuck flange section 34 is centrally located on the flap structure and is substantially narrower than the flanges 32 and 33. The upper edges of the end wall liner panels 25 are notched as indicated at 35, the notch being designed to accommodate the tuck flange 34. Hand holes 36 are provided in the end walls 11 below the level of the notches 35 in the end wall lining flaps. Registering hand holes 37 are provided in the tuck flanges 34. Slots 39 extend centrally across the flanges 32 and 33 terminating at the fold line 27 and 31. The slots 39 are in right angular relation to the fold lines 27.

Cover panels 40 are hingedly connected to the upper edges of the side walls 10 and 12 along aligned fold lines 41 which are substantially aligned with the fold lines 27. The cover panels 40 are of a length substantially equal to one-half the width of the end walls 11 and 13. Tuck flaps 42 are hingedly connected to the ends of the cover panels 40 along fold lines 43 parallel to the fold lines 41.

After the body of the container has been set up as previously described, the flap structures 26 are folded along the fold lines 27, 30, and 31 to form the triangular strut shown in FIG. 4 of the drawings. A tuck flange 34 is inserted in the notch 35 of each end wall liner panel 25 so as to lie between the end wall liner panel and the end walls 11 and 13. As will be seen in FIG. 4 of the drawings, when the tuck flange 34 is in position, the edges 44 of the reinforcing flange 33 engage against the inner surface of the end wall liner panel 25 while the flange 34 engages the outer surface of the panel 25. As a result, the container is effectively locked in rectangular form.

In order to close the container, the cover tuck flaps 42 are folded into right angular relation to the cover panels 40, and the cover panels are folded down into a common plane, the ends of the tuck flaps 42 engaging in the slots 39 in the flap structures 26.

Potential vent holdes 45 are provided in the side walls 10 and 12. These vent holes are formed by arcuate cutting rule which cuts almost about the periphery of each hole, but leaves just enough paperboard imperforate to leave the circular areas in place. The top panel or cover panels 40 are provided with similar potential vent holes 46. The vent holes may be opened by merely punching out the circular discs from the desired number of the potential holes.

When the fingers are inserted through the hand holes 36 and 37, they tend to engage against the end wall liner panels 25, flexing these panels inwardly sufficiently to permit the container to be lifted. The fingers thus do not enter the pet area, and are not exposed to the animal being carried. This is important, as the animal would normally tend to bite the fingers if they were exposed.

In accordance with the patent statutes, I have described the principles of construction and operation of my carrier carton and while I have endeavored to set forth the best embodiment thereof, I desire to have it understood that obvious changes may be made within the following claims without departing from the spirit of my invention.

I claim:
1. An animal shipping container including:
   rectangularly arranged side and end walls connected in tubular relation,
   bottom panels hinged to the lower edges of said side walls and folded into face contact to form a bottom closure,
   end wall liner panels hinged to the end edges of the lowermost of said bottom panels and extending inwardly of said end walls,
   a flap structure hinged to the upper edges of said end walls and including a horizontal flange extending inwardly from the upper edges of said end walls, and a reinforcing flange extending downwardly and outwardly from the inner edge of each said horizontal flange,
   each said end wall liner panel including a notch intermediate its ends,
   a tuck flange on the lower edge of each said reinforcing flange extending through said notch and between the corresponding end wall and corresponding said end wall liner panel, the portions of said reinforcing flange on opposite sides of said tuck flange engaging the inner surface of said end wall liner panel.
2. The structure of claim 1 and in which said end walls are provided with hand holes therethrough outwardly of said end wall liner panels.
3. The structure of claim 2 and in which said tuck flanges are provided with hand holes therethrough in registry with the hand holes in said end walls.
4. The structure of claim 1 and in which each said horizontal flange and said reinforcing flange have central slots, and including cover panels hinged to the upper edges of said side walls, and tuck flaps on said cover panels foldable into face contact and engageable into said slots.
5. The structure of claim 1 and including cover panels hingedly connected to the upper edges of said side walls and foldable against said horizontal flanges.

References Cited

UNITED STATES PATENTS

| | | |
|---|---|---|
| 2,321,536 | 6/1943 | Wells. |
| 2,950,850 | 8/1960 | Corcoran. |
| 3,383,028 | 5/1968 | Brander. |

FOREIGN PATENTS

| | | |
|---|---|---|
| 240,258 | 5/1965 | Austria. |
| 619,981 | 5/1961 | Canada. |

DONALD F. NORTON, Primary Examiner

S. E. LIPMAN, Assistant Examiner

U.S. Cl. X.R.

229—52; 119—19